(12) United States Patent
Weber

(10) Patent No.: US 12,458,489 B2
(45) Date of Patent: Nov. 4, 2025

(54) DEFINED REMOVAL SITE ON STERILE BLISTER PACK

(71) Applicant: ALCON INC., Fribourg (CH)

(72) Inventor: Marec Weber, Erlangen (DE)

(73) Assignee: ALCON INC., Fribourg (CH)

( * ) Notice: Subject to any disclaimer, the term of this patent is extended or adjusted under 35 U.S.C. 154(b) by 0 days.

(21) Appl. No.: 18/592,481

(22) Filed: Feb. 29, 2024

(65) Prior Publication Data

US 2024/0261088 A1    Aug. 8, 2024

Related U.S. Application Data

(60) Continuation of application No. 17/313,245, filed on May 6, 2021, now abandoned, which is a division of application No. 16/309,124, filed as application No. PCT/IB2016/054273 on Jul. 18, 2016, now abandoned.

(51) Int. Cl.
| | |
|---|---|
| *A61B 50/30* | (2016.01) |
| *A61B 50/00* | (2016.01) |
| *A61F 2/16* | (2006.01) |
| *A61J 1/00* | (2023.01) |
| *A61L 2/26* | (2006.01) |
| *B65B 69/00* | (2006.01) |
| *A61B 90/00* | (2016.01) |

(52) U.S. Cl.
CPC ............ *A61F 2/1691* (2013.01); *A61B 50/00* (2016.02); *A61B 50/30* (2016.02); *A61J 1/00* (2013.01); *A61L 2/26* (2013.01); *B65B 69/00* (2013.01); *B65B 69/0058* (2013.01); *A61B 2050/0051* (2016.02); *A61B 2050/0065* (2016.02); *A61B 2050/3008* (2016.02); *A61B 2090/0807* (2016.02); *A61L 2202/12* (2013.01); *A61L 2202/181* (2013.01); *A61L 2202/182* (2013.01); *A61L 2202/21* (2013.01); *A61L 2202/24* (2013.01)

(58) Field of Classification Search
CPC ............ A61B 53/30; A61B 2050/0051; A61B 2050/0065; A61B 2050/3008; A61B 50/30; B65D 75/36; B65D 75/366; B65D 75/367; A61L 2/26; A61F 2/1691
USPC ........................................................ 206/438
See application file for complete search history.

(56) References Cited

U.S. PATENT DOCUMENTS

| | | | | |
|---|---|---|---|---|
| 5,311,989 | A * | 5/1994 | Ward | B65D 75/328 |
| | | | | 206/705 |
| 5,485,917 | A * | 1/1996 | Early | A61B 50/30 |
| | | | | 206/363 |
| 6,957,909 | B1 | 10/2005 | Dingeldein | |
| 10,160,113 | B2 * | 12/2018 | Grinwald | B65D 75/321 |
| 2005/0218027 | A1 * | 10/2005 | Lammers | B65D 75/366 |
| | | | | 206/467 |
| 2006/0124506 | A1 * | 6/2006 | Fuchs | B65D 75/367 |
| | | | | 206/703 |
| 2008/0302697 | A1 * | 12/2008 | Cude | A61M 5/002 |
| | | | | 220/4.27 |
| 2009/0321295 | A1 * | 12/2009 | Ede | A61M 15/0045 |
| | | | | 206/532 |
| 2010/0063457 | A1 * | 3/2010 | Crossman | A61M 5/3293 |
| | | | | 604/263 |

(Continued)

*Primary Examiner* — Steven A. Reynolds (57) ABSTRACT

A system and method for systematic, controlled removal of sterile products from blister packs for use during surgery is disclosed.

20 Claims, 6 Drawing Sheets

(56) References Cited

U.S. PATENT DOCUMENTS

| | | | |
|---|---|---|---|
| 2014/0262919 A1* | 9/2014 | Hussain | A61J 1/035 |
| | | | 206/534 |
| 2015/0108023 A1* | 4/2015 | Bergey | B29C 51/14 |
| | | | 264/320 |
| 2015/0114855 A1* | 4/2015 | Glick | B65D 81/18 |
| | | | 206/5 |
| 2017/0128662 A1* | 5/2017 | Schill | A61M 5/002 |
| 2017/0239144 A1* | 8/2017 | Terhune | B65D 83/0463 |
| 2018/0015217 A1* | 1/2018 | Hasumi | B65D 75/366 |
| 2018/0161491 A1* | 6/2018 | Sanders | B65D 75/366 |
| 2019/0092547 A1* | 3/2019 | Sadowski | A61B 50/30 |
| 2021/0228122 A1* | 7/2021 | Wilkinson | A61B 5/15003 |
| 2023/0248898 A1* | 8/2023 | Cook | A61L 2/206 |
| | | | 604/500 |

\* cited by examiner

DEFINED REMOVAL SITE ON STERILE BLISTER PACK

RELATED APPLICATIONS

This application is a continuation application claiming benefit to U.S. patent application Ser. No. 17/313,245, filed May 6, 2021 and entitled "DEFINED REMOVAL SITE ON STERILE BLISTER PACK," which is a divisional application of Ser. No. 16/309,124, filed Dec. 12, 2018 and entitled "DEFINED REMOVAL SITE ON STERILE BLISTER PACK," which is a '371 application of PCT/IB2016/054273, filed Jul. 18, 2016 and entitled "DEFINED REMOVAL SITE ON STERILE BLISTER PACK." All applications are incorporated herein by reference in their entirety.

TECHNICAL FIELD

The present disclosure relates to systems and methods for systematic, controlled removal of sterile products from blister packs for use during eye surgery.

BACKGROUND

During eye surgery, such as refractive surgery, sterile products are often provided in blister packs. These products of have sensitive surfaces, such as a lens.

Currently, a non-sterile user, such as the operating room nurse, opens the blister pack. The outside of the blister pack is not sterile and must be touched to open the closed blister pack. Then, non-sterile user must perform hand disinfection before removing items from the opened blister pack. This complicates and lengthens the surgical procedure and makes accidental contamination and loss of sterility more likely.

SUMMARY

This disclosure provides a way to allow removal of the sterile items with sensitive surfaces from the blister pack without requiring the non-sterile user to perform hand disinfection.

In one embodiment, the disclosure relates to a method of using a blister pack with sterile products inside, removing the protective layer from the blister pack, inverting the blister pack, placing the blister pack on a sterile surface, pressing on at least one defined pressure point on the back of the blister pack, and removing the blister pack.

In another embodiment, the disclosure relates to a method of using a blister pack with sterile products inside, removing the protective layer from the blister pack, inverting the blister pack, placing the blister pack on a sterile surface, removing a removable lug from at least one defined point on the back of the blister pack, and removing the blister pack.

In another embodiment, the disclosure relates to a blister back with a sterile holding area, a sterile eye surgery instrument, and at least one point marked on the back of the back of the blister pack for controlled removal of the sterile eye surgery instrument.

Other technical advantages will be apparent to those of ordinary skill in the art in view of the following specification, claims, and drawings.

BRIEF DESCRIPTION OF THE DRAWINGS

For a more complete understanding of the present invention and its features and advantages, reference is now made to the following description, taken in conjunction with the accompanying drawings, and in which.

DETAILED DESCRIPTION

This disclosure provides a way to allow removal of the sterile items with sensitive surfaces from the blister pack without requiring the non-sterile user to perform hand disinfection. This disclosure provides a blister pack with defined pressure points and methods of its use.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
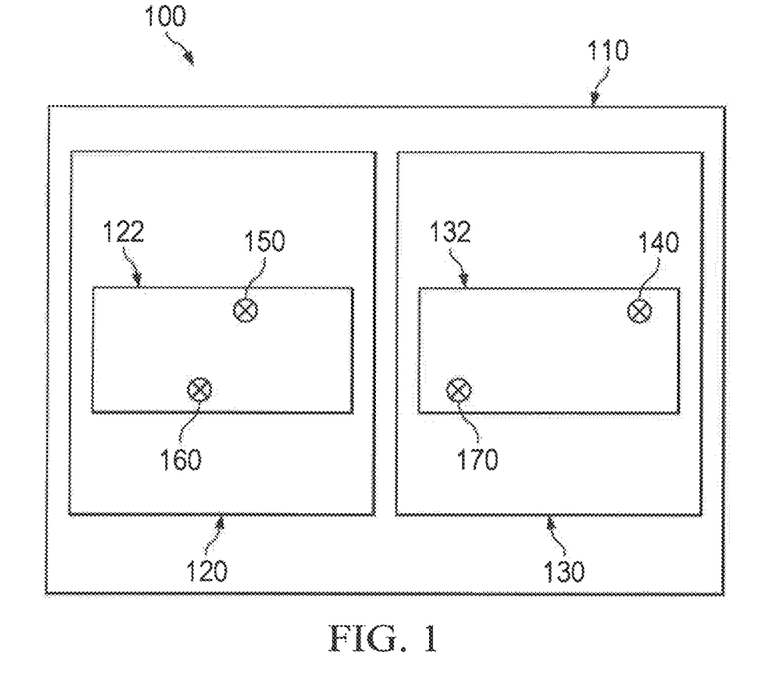
FIG. 1 is a not-to-scale schematic view of the front of a blister pack with two sterile eye surgery instruments and defined pressure points.
Figure 2:
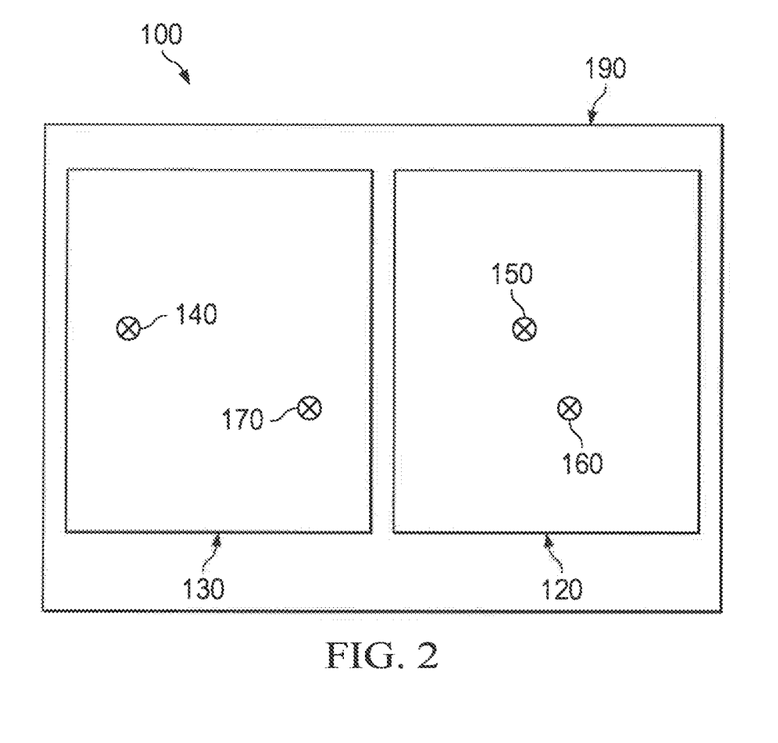
FIG. 2 is a not-to-scale schematic view of the back of the blister pack of FIG. 1.

Referring now to the drawings, FIG. 1 and FIG. 2 are blister pack 100. In the embodiment shown in FIG. 1, the front 110 of a blister pack 100 includes two sterile holding areas 120, 130. Each sterile holding area is shown with a single sterile eye surgery instrument (e.g. sterile eye surgery instrument 122, sterile eye surgery instrument 132). Blister packs with a single sterile holding area are also possible. More than the one sterile eye surgery instrument may be placed in a single sterile holding area. In the embodiment show in FIG. 2, the back 190 of blister pack 100 is shown. The location of sterile holding areas 120 and 130 and pressure points 140, 150, 160, and 170 are shown. Pressure points 140, 150, 160, and 170 are located within the sterile holding areas 120 and 130.

Non-limiting examples of sterile eye surgery instruments that could be used during eye surgery, such as refractive surgery, is an applanation cone or a lens.

FIG. 1 and FIG. 2, as shown, are actually marked with a circled "X" at pressure points 140, 150, 160, and 170. Such markings are optional for any or all pressure points 140, 150, 160, and 170, and if marked, other indicators may be used such as an "X" mark or an embossed word, e.g. "push." Optionally, pressure points 140, 150, 160, and 170 are marked on the rear surface 190 of blister pack 100 and not on the front surface 110. If the blister pack requires that the pressure points be pressed in a particular order or in particular combinations, then the blister pack will be so marked.

The invention does not require the rear surface 190 of blister pack 100 to be sterile.

Pressure points are placed to avoid sensitive spots or brittle spots on the sterile eye surgery instruments. In the case of a package design with simple sterile barriers, the absence of such defined pressure points means an increased risk of damage, especially to sensitive surfaces during removal of the sterile eye surgery instrument. By allowing controlled removal of the sterile eye surgery instrument using the pressure points, the sterile eye surgery instrument should drop out at a controlled time and in a controlled manner.

In another embodiment, not shown, blister pack 100 may include movable lugs instead of any one or more of the pressure points. The movable lugs are designed to keep the inside of blister pack 100 sterile when they are moved, e.g. actuated, removed, moved, or unscrewed.

Figure 3:
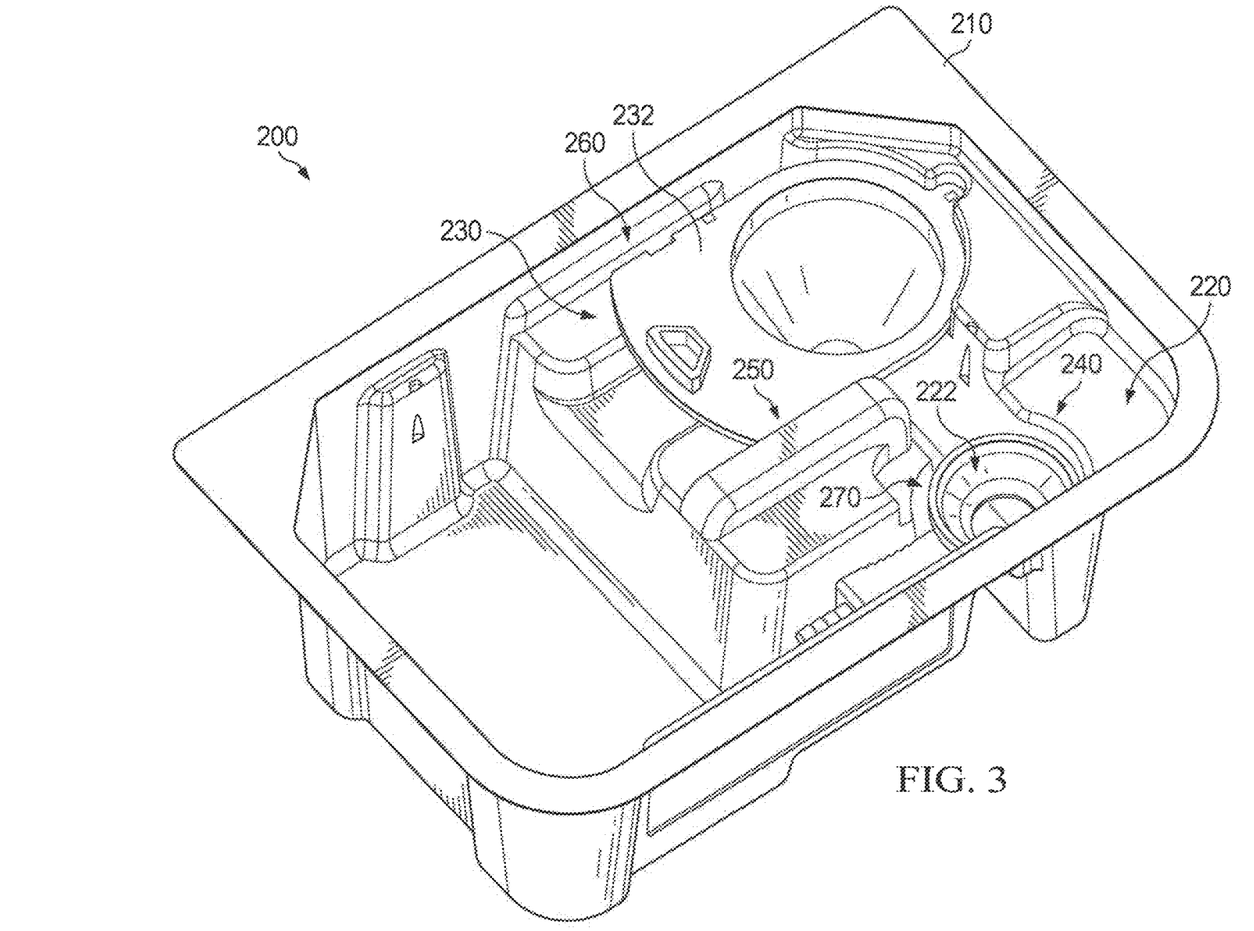
FIG. 3 is an elevation view of the front of a blister pack with defined pressure points.

FIG. 3 is an elevation view of the front of a blister pack 200 with defined pressure points. In the embodiment shown in FIG. 3, the front 210 of a blister pack 200 includes two sterile holding areas 220, 230. Each sterile holding area is shown with a single sterile eye surgery instrument (e.g. sterile eye surgery instrument 222, sterile eye surgery instrument 232). Blister packs with a single sterile holding area are also possible. More than one sterile eye surgery instruments may be placed in a single sterile holding area. The location of sterile holding areas 220 and 230 and pressure points 240, 250, and 260 are shown.

Figure 4:
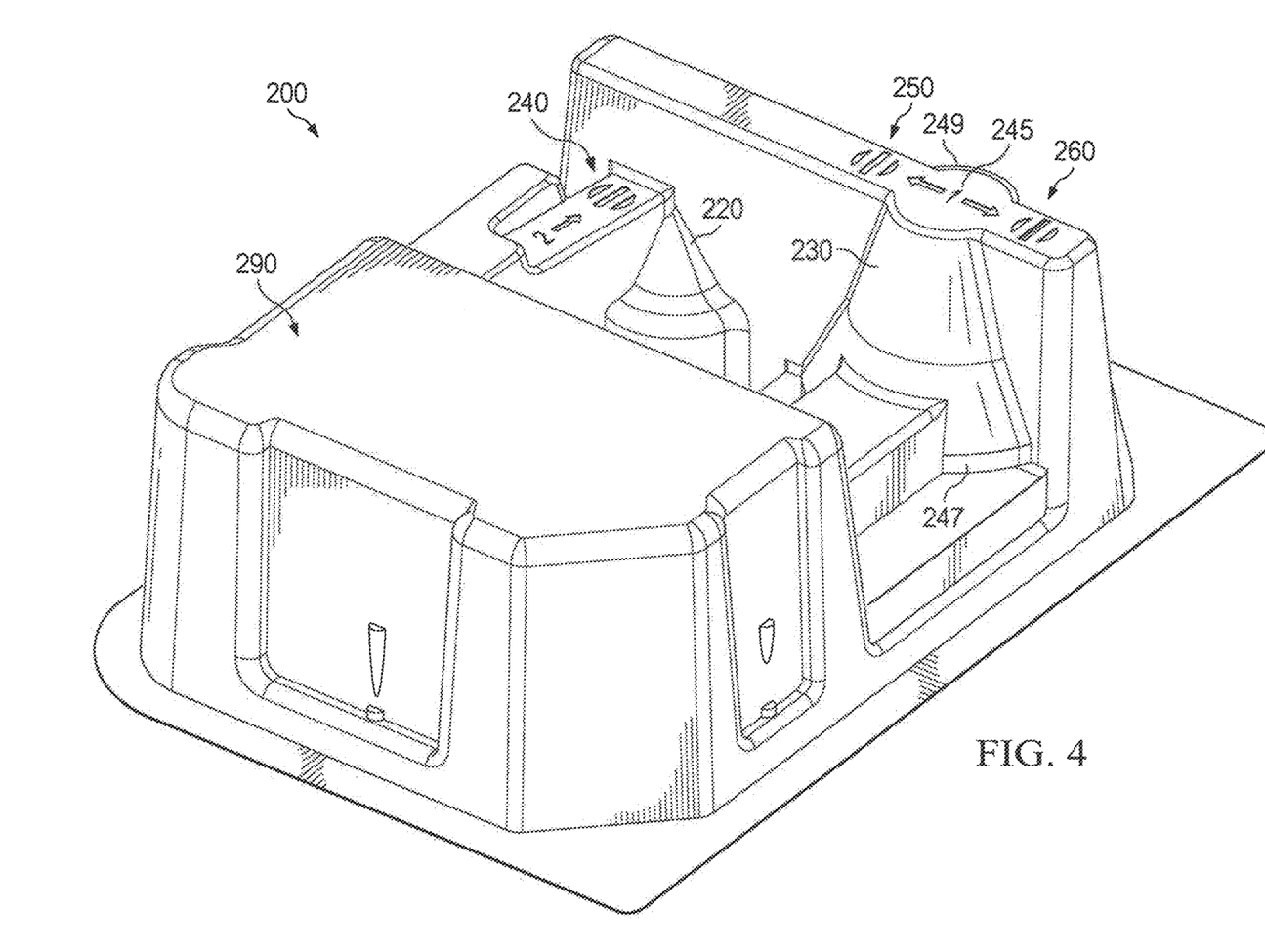
FIG. 4 is an elevation view of the back of the blister pack of FIG. 3.

FIG. 4 is an elevation view of the back of the blister pack 200 with defined pressure points. In the embodiment shown in FIG. 4, the back 290 of blister pack 200 is shown. The location of sterile holding areas 220 and 230 and pressure points 240, 250, and 260 are shown. Sterile holding area 230 has an apex 245, a larger circular base 247, and a smaller circular base 249. Pressure points 240, 250, and 260 are located near the sterile holding areas 220 and 230.

Figure 5:
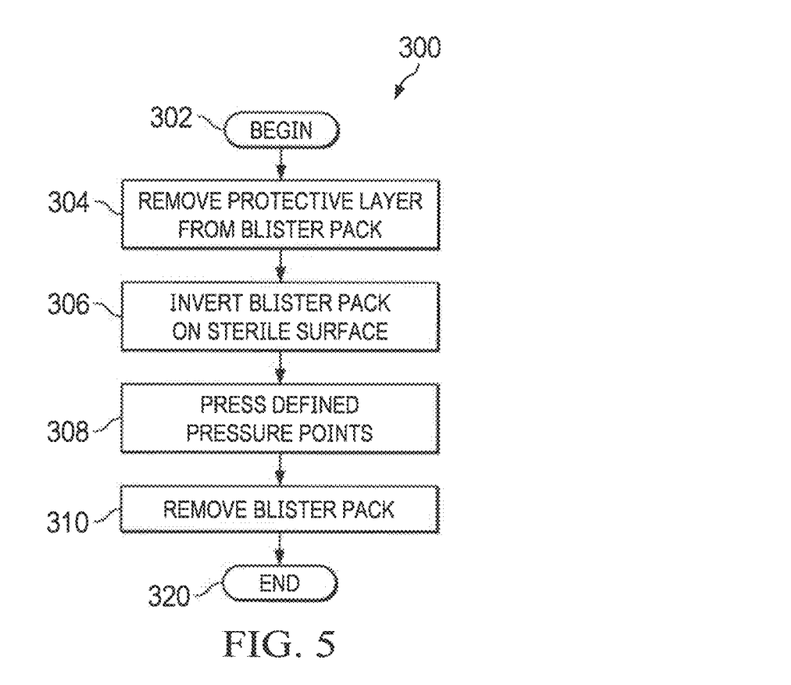
FIG. 5 is flow chart of a method for using a blister pack with defined pressure points.

FIG. 5 is flow chart of a method of using a blister pack with defined removal sites, such as blister pack 100.

In this embodiment, operating room (OR) preparation or an eye surgery procedure is begun, 302.

A protective cover is removed from the blister pack, 304.

Then the blister pack is inverted onto a sterile surface, 306. It is important to maintain the surface and the inside of the blister pack as both sterile.

Next, at least one and likely all pressure points are pressed, 308. If the blister pack requires that the pressure points be pressed in a particular order or in particular combinations, then the blister pack will be so marked. In another embodiment, the pressure points are removable lugs that are removed at this step.

Finally, the blister pack is removed from the sterile surface, 310. The method ends, 320.

Figure 6:
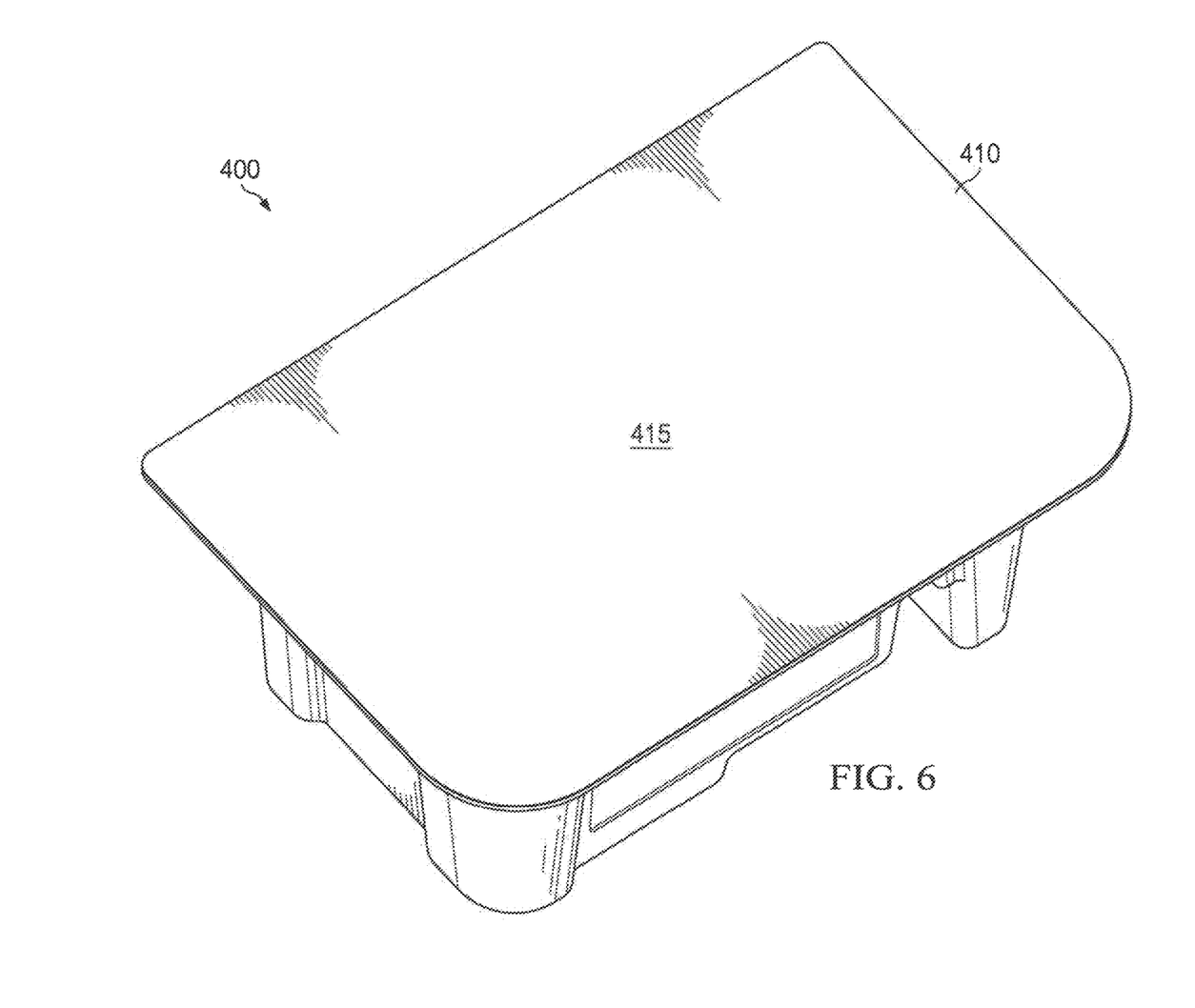
FIG. 6 is an elevation view of the front of a blister pack with a protective cover.

FIG. 6 is an elevation view of a front 410 of a blister pack 400 with a protective cover 415. In the embodiment shown in FIG. 6, the protective cover 415 is removably coupled to the front 410 of the blister pack 400.

Figure 7:
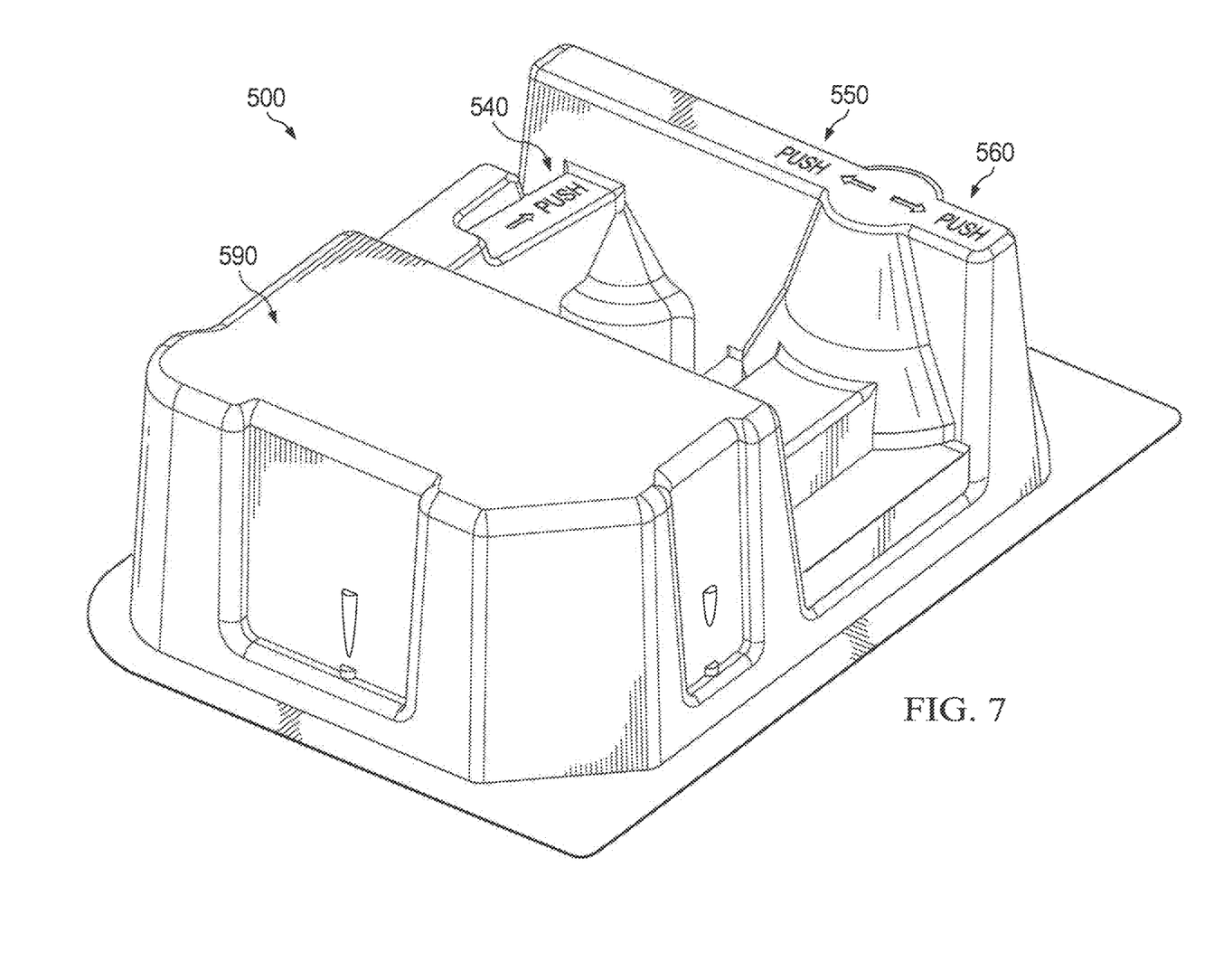
FIG. 7 is an elevation view of the back of a blister pack.

FIG. 7 is an elevation view of a back 590 of a blister pack 500 with defined pressure points 540, 550, and 560. In the embodiment shown in FIG. 7, the pressure points 540, 550, and 560 are marked with an embossed word "push".

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. For instance, many example embodiments herein are depicted and described using a blister pack. It will be apparent to one of ordinary skill in the art that a variety of types of sterile eye surgery instruments, may be used in such embodiments with corresponding increases in the complexity of blister pack design.

What is claimed is:

1. A system comprising:
  a blister pack having a front and a back, the blister pack comprising:
    a plurality of sterile holding areas, each sterile holding area configured to accommodate a sterile eye surgery instrument of a plurality of sterile eye surgery instruments, the plurality of sterile holding areas comprising a frustoconical sterile holding area having a frustoconical shape configured to accommodate a sterile eye surgery instrument of the plurality of sterile eye surgery instruments comprising an applanation cone, the frustoconical sterile holding area having a larger circular base and a smaller circular base, the larger circular base proximate to the front of the blister pack, the smaller circular base proximate to the back of the blister pack; and
    a plurality of pressure points disposed at the back of the blister pack for controlled removal of the plurality of sterile eye surgery instruments while maintaining sterility of the plurality of sterile eye surgery instruments, wherein:
      at least two pressure points of the plurality of pressure points comprise:
        a first pressure point marked to indicate that the first pressure point should be used first to remove a first sterile eye surgery instrument from the blister pack; and
        a second pressure point marked to indicate that the second pressure point should be used second to remove a second sterile eye surgery instrument from the blister pack; and
      the plurality of pressure points comprise a cone pressure point disposed at the back of the blister pack proximate to the smaller circular base of the frustoconical sterile holding area to facilitate controlled removal of the applanation cone; and
  a protective cover removably coupled to the blister pack.

2. The system of claim 1, wherein:
  each pressure point of the plurality of pressure points is disposed at a location proximate to but distinct from a sterile eye surgery instrument of the plurality of sterile eye surgery instruments.

3. The system of claim 1, wherein:
  one or more pressure points of the plurality of pressure points are disposed at one or more locations proximate to but distinct from the frustoconical sterile holding area.

4. The system of claim 1, wherein:
  the frustoconical shape of the frustoconical sterile holding area has a smaller diameter circular surface; and
  one or more pressure points of the plurality of pressure points are disposed proximate to the smaller diameter circular surface.

5. The system of claim 1, wherein;
  the frustoconical shape of the frustoconical sterile holding area has a smaller diameter circular surface;
  a first of a pair of pressure points of the plurality of pressure points is disposed proximate to the smaller diameter circular surface; and
  a second of the pair of pressure points of the plurality of pressure points is disposed opposite the smaller diameter circular surface from the first of the pair of pressure points of the plurality of pressure points.

6. The system of claim 1, wherein:
  the plurality of sterile holding areas comprises a conical sterile holding area having a conical shape with an apex; and one or more pressure points of the plurality of pressure points are disposed proximate to the apex of the conical shape of the conical sterile holding area.

7. The system of claim 1, wherein:
the plurality of sterile holding areas comprises a rectangular sterile holding area having a rectangular shape.

8. The system of claim 1, wherein:
the plurality of sterile eye surgery instruments comprises a lens; and
the plurality of sterile holding areas comprises a lens sterile holding area configured to accommodate the lens.

9. The system of claim 1, wherein:
the plurality of sterile holding areas comprises a conical sterile holding area and a rectangular sterile holding area; and
the conical sterile holding area is adjacent to the frustoconical sterile holding area; and
the conical sterile holding area and the frustoconical sterile holding area are adjacent to the rectangular sterile holding area.

10. The system of claim 1, wherein:
the plurality of pressure points are disposed within the plurality of sterile holding areas.

11. The system of claim 1, wherein:
the plurality of pressure points are disposed near the plurality of sterile holding areas.

12. The system of claim 1, wherein:
each pressure point of the plurality of pressure points is marked with an embossed word "push".

13. The system of claim 1, wherein;
each pressure point of the plurality of pressure points is marked with a circled "X".

14. The system of claim 1, wherein:
each pressure point of the plurality of pressure points is marked on the front of the blister pack; and
each pressure point of the plurality of pressure points is marked on the back of the blister pack.

15. The system of claim 1, wherein:
each pressure point of the plurality of pressure points is marked only on the back of the blister pack.

16. The system of claim 1, wherein:
each pressure point of the plurality of pressure points is marked only on the front of the blister pack.

17. The system of claim 1, wherein a first pair of pressure points of the plurality of pressure points are disposed on a base of the back of the blister pack and a third pressure point of the plurality of pressure points is disposed between the base and a front surface of the blister pack.

18. The system of claim 1, further comprising an arrow pointing to a given pressure point of the plurality of pressure points.

19. The system of claim 18, wherein, for each pressure point of the plurality of pressure points, the system comprises a respective arrow pointing to a respective pressure point of the plurality of pressure points.

20. The system of claim 18, wherein, the arrow is on the back of the blister pack.

* * * * *